United States Patent
Bhakta et al.

(10) Patent No.: US 9,645,889 B2
(45) Date of Patent: *May 9, 2017

(54) METHODS, SYSTEMS, AND PHYSICAL COMPUTER STORAGE MEDIA FOR BACKING UP A SERVER DATABASE

(71) Applicant: INTERNATIONAL BUSINESS MACHINES CORPORATION, Armonk, NY (US)

(72) Inventors: Snehal S. Bhakta, Tucson, AZ (US); Shannon L. Gallaher, Tucson, AZ (US); Stanley M. Kissinger, Tucson, AZ (US); Glenn R. Wilcock, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/671,700

(22) Filed: Mar. 27, 2015

(65) Prior Publication Data
US 2015/0205679 A1   Jul. 23, 2015

Related U.S. Application Data

(63) Continuation of application No. 13/765,101, filed on Feb. 12, 2013, now Pat. No. 9,043,281, which is a (Continued)

(51) Int. Cl.
G06F 17/00    (2006.01)
G06F 17/30    (2006.01)
G06F 11/14    (2006.01)

(52) U.S. Cl.
CPC ...... *G06F 11/1458* (2013.01); *G06F 11/1474* (2013.01); *G06F 17/3038* (2013.01);
(Continued)

(58) Field of Classification Search
CPC ............ G06F 2201/87; G06F 11/1458; G06F 11/1474; G06F 17/30227; G06F 17/3038;
(Continued)

(56) References Cited

U.S. PATENT DOCUMENTS 6,877,016 B1    4/2005   Hart et al.
7,213,029 B2    5/2007   Nelson et al.
(Continued)

OTHER PUBLICATIONS

E. Levy et al., pp. 529-540, vol. 4, No. 6, IEEE Transactions on Knowledge and Data Engineering.
(Continued)

*Primary Examiner* — Yicun Wu
(74) *Attorney, Agent, or Firm* — Griffiths & Seaton PLLC

(57) ABSTRACT

A method is now provided that improve backing up server data sets. Each server database transaction is registered to a central server repository prior to starting the database transaction, each database transaction comprising a plurality of writes to be executed for a database application on a database, and quiescing all database transactions registered to the central server repository to thereby wait for all ongoing writes of the database transactions registered to the central server repository to complete and to release control of the database.

6 Claims, 6 Drawing Sheets

Related U.S. Application Data continuation of application No. 13/153,855, filed on Jun. 6, 2011, now Pat. No. 8,682,855.

(52) U.S. Cl.
CPC .. *G06F 17/30227* (2013.01); *G06F 17/30864* (2013.01); *G06F 2201/87* (2013.01)

(58) Field of Classification Search
CPC ........... G06F 17/30864; G06F 11/1466; G06F 11/2007; G06F 11/2097; G06F 17/30362; G06F 11/1471; G06F 2201/82; G06F 11/1446

See application file for complete search history.

(56) References Cited

U.S. PATENT DOCUMENTS

| | | |
|---|---|---|
| 7,539,703 B2 | 5/2009 | Mizuno et al. |
| 7,716,433 B2 | 5/2010 | Dutta et al. |
| 7,966,298 B2 | 6/2011 | Bruso et al. |
| 8,725,686 B2 | 5/2014 | Watanabe et al. |
| 2004/0088298 A1* | 5/2004 | Zou ................... G06F 17/30575 |
| 2004/0133591 A1* | 7/2004 | Holenstein .......... G06F 11/2064 |
| 2006/0179085 A1 | 8/2006 | Kaijima et al. |

OTHER PUBLICATIONS

Mainstar, 2 pages, 2010.
R. Haupert, 10 pages, Jun. 2010.

* cited by examiner

METHODS, SYSTEMS, AND PHYSICAL COMPUTER STORAGE MEDIA FOR BACKING UP A SERVER DATABASE

CROSS REFERENCE TO RELATED APPLICATIONS

This application is a Continuation of U.S. patent application Ser. No. 13/765,101, filed on Feb. 12, 2013, which is a Continuation of U.S. patent application Ser. No. 13/153,855, filed on Jun. 6, 2011, both of which are hereby incorporated by reference in their entirety.

FIELD OF THE INVENTION

The present invention relates in general to databases and a method for backing up a computer server database.

DESCRIPTION OF THE RELATED ART

Data processing server systems often store significant quantities of valuable data. For example, data processing systems may store transaction data, inventory data, customer service configurations, account information, and the like. The data may be stored as a plurality of data sets across one or more physical storage volumes, referred to herein as source volumes. A data set may be a file, a database, and/or other logical organization of data.

SUMMARY OF THE INVENTION

Although the point-in-time techniques have been adequate, such methods of backing up data sets can be improved. For example, because the backup application waits for all pending database application transactions to complete, the start of the backup application depends on when all of the pending database application transactions can complete or quiesce. Hence, in some cases, database application transactions that may be relatively complex may run for a relatively long period of time, and new transactions cannot begin until after the pending database application transactions and backup application are complete.

In one embodiment, by way of example only, a method for improving the back up of server data sets is provided and includes, registering each database transaction to a central server repository prior to starting the database transaction, each database transaction comprising a plurality of writes to be executed for a database application on a database, and quiescing all database transactions registered to the central server repository to thereby wait for all ongoing writes of the database transactions registered to the central server repository to complete and to release control of the database.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As aforementioned, data server processing systems often store significant quantities of valuable data. For example, data processing systems may store transaction data, inventory data, customer service configurations, account information, and the like. The data may be stored as a plurality of data sets across one or more physical storage volumes, referred to herein as source volumes. A data set may be a file, a database, and/or other logical organization of data.

Data is protected by frequently making backup copies, referred to herein as "backing up." Frequent backing up minimizes the potential for data loss. Unfortunately, backing up data sets consumes data processing system bandwidth. Additionally, many database applications require the application to be inactive while the database is being backed up. In these regards, point-in-time techniques are typically employed to ensure that the periods of inactivity occur during brief time windows. The brief time windows begin only after the backup application has serialized upon the database. The data sets may be critical to an organization employing the data processing system. As a result, data sets are typically copied to protect against loss. The data processing system may copy a data set to one or more backup physical storage volumes to back up the data set. The backup physical storage volumes are referred to herein as backup volumes.

The illustrated embodiments below provide a method of backing up a server database. The method includes registering each database transaction to a central server repository prior to starting the database transaction, each database transaction comprising a plurality of writes to be executed for a database application on a database, and quiescing all database transactions registered to the central server repository to thereby wait for all ongoing writes of the database transactions registered to the central server repository to complete and to release control of the database. By maintaining the central server repository and allowing only the ongoing writes to complete, the backup application gains control of the database more quickly than with conventional backup systems. Additionally, the database application can reacquire control to resume pending writes of the database transactions registered to the central server repository to thereby complete the registered database transactions. The embodiments described below further provide systems and physical computer storage media capable of implementing the described methods.

Figure 1:
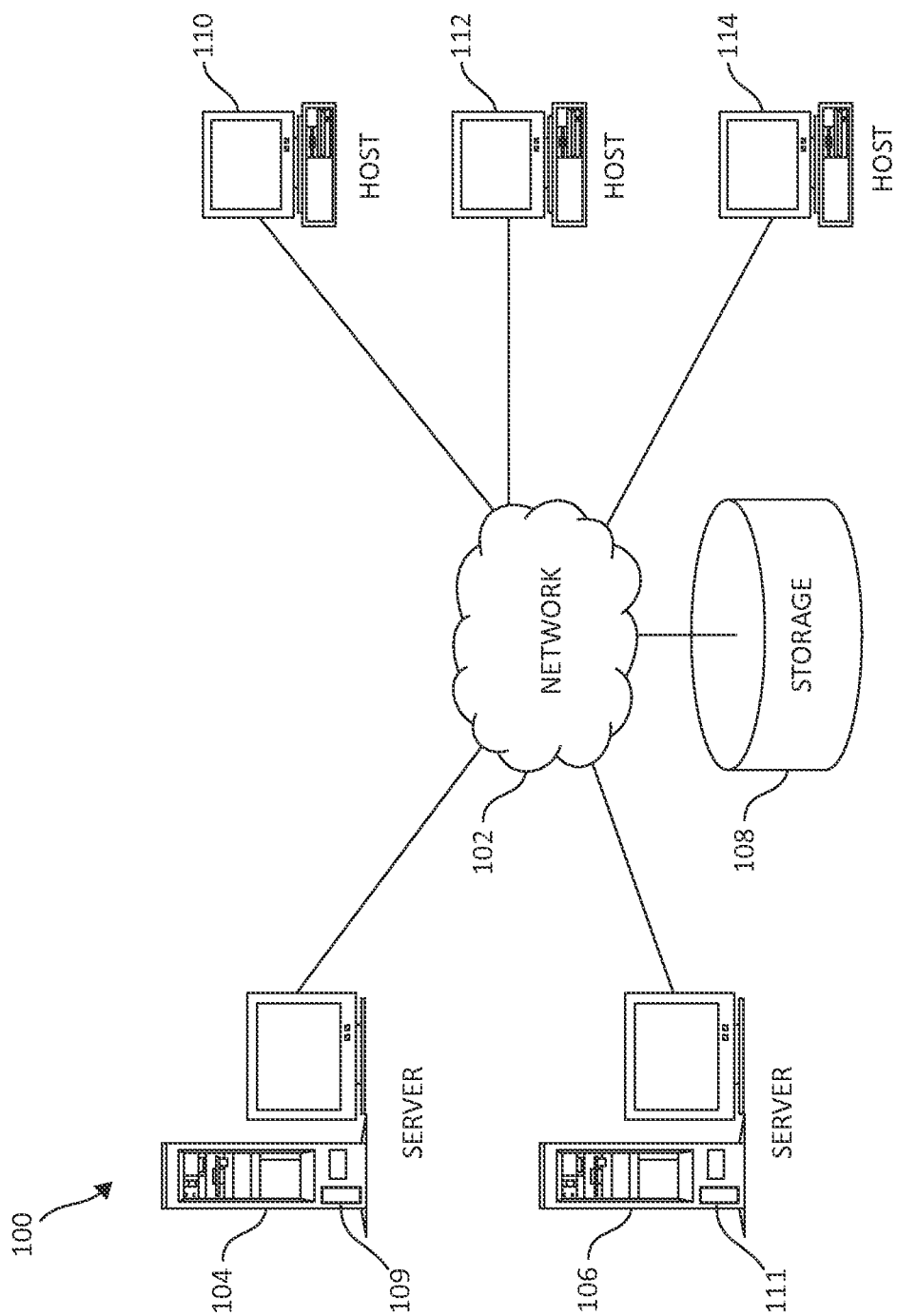
FIG. 1 is an example pictorial representation of a distributed data processing system, according to an embodiment.
Figure 2:
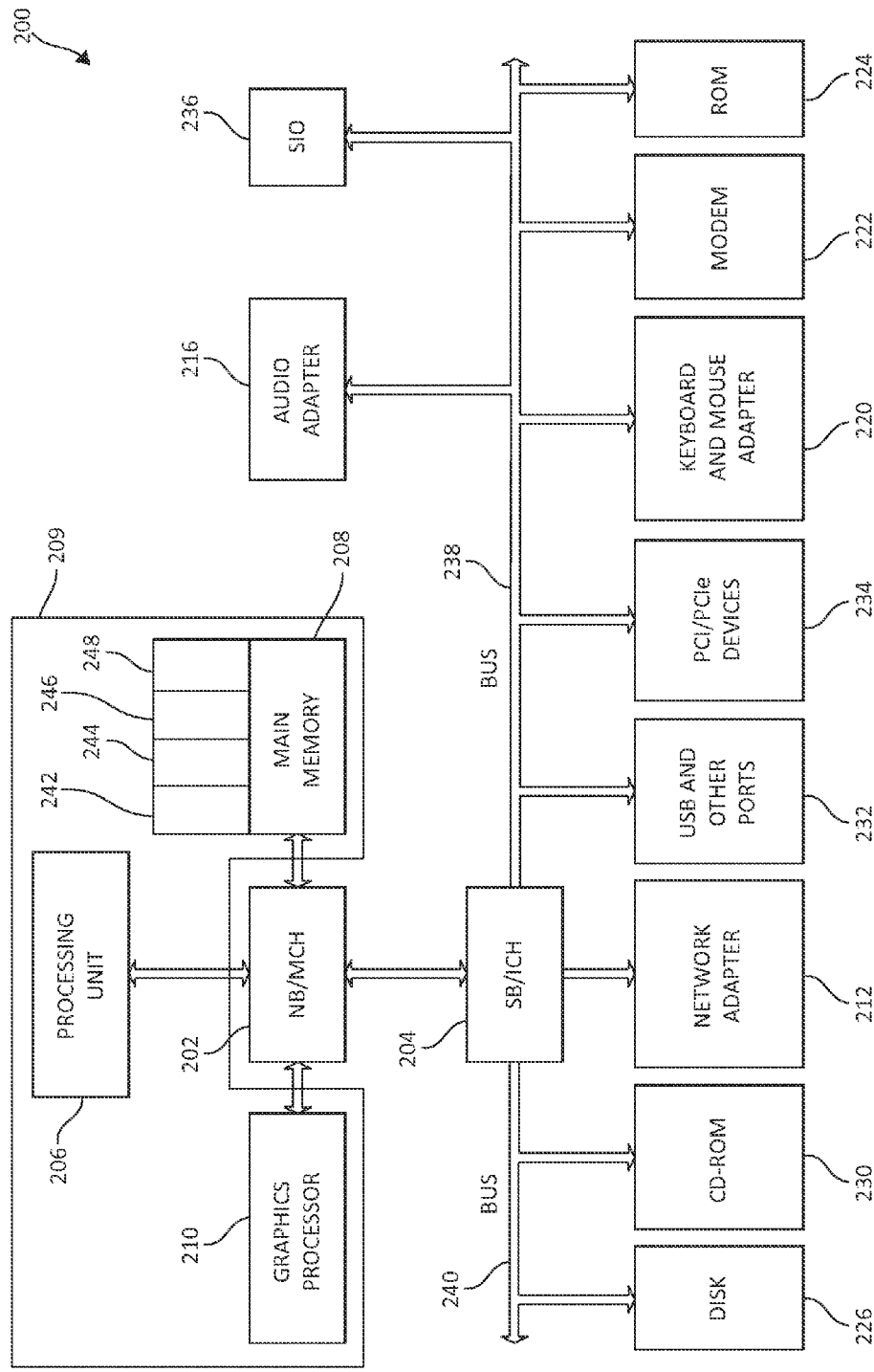
FIG. 2 is an example block diagram of a data processing device, according to an embodiment.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. One or both of the servers 104, 106 includes a storage controller 109, 111 that is configured to control storage and access of data stored on the storage unit 108. Storage unit 108 may be any type of storage unit or storage system. Examples of storage unit 108 may include an advanced storage device, such as a DS8000 dual node controller, or a file server, such as a network attached storage (NAS) device. Although two servers 104, 106 are shown, more or fewer can be included in other embodiments.

In addition, hosts 110, 112, and 114 are also connected to network 102. These hosts 110, 112, and 114 may be, for example, personal computers, network computers, or the like. In the depicted example, one or both of servers 104, 106 provide data, such as boot files, operating system images, and applications to the hosts 110, 112, and 114. Hosts 110, 112, and 114 are hosts to one or both of servers 104, 106 in the depicted example. Distributed data processing system 100 may include additional servers, hosts, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. The illustrative embodiments are also particularly well suited for implementation with networks, such as SANs, where the wires and switches utilize Fibre Channel, iSCSI, FCOCEE, or the like technologies. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as host 110 in FIG. 1, in which computer usable code or instructions implementing the processes for illustrative embodiments of the present invention may be located.

Data processing system 200 includes a controller 209 comprising a processor 206, main memory 208 and, alternatively, a graphics processor 210. The controller 209 supplies commands to run database and/or backup applications to the system 200. In the depicted embodiment, the data processing system 200 employs a hub architecture including north bridge and memory controller hub (NB/MCH) 202 and south bridge and input/output (I/O) controller hub (SB/ICH) 204. Processor 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processor 206. The operating system coordinates and provides control of various components within the data processing system 200 in FIG. 2. As a host, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processor 206. Alternatively, a single processor system may be employed. Moreover, in one illustrative embodiment, the data processing system 200 may be comprised of one or more System p servers with a network of host adapters to communicate over the network 102 in FIG. 1, and a network of RAID adapters to communicate to a plethora of storage devices.

Computer code for the operating system, the object-oriented programming system, and applications or programs (such as backup applications or database applications) are located on storage devices, such as HDD 226, and may be loaded into main memory 208 for execution by processor 206. The processes for illustrative embodiments of the present invention may be performed by processor 206 using computer usable program code, which may be located in a memory such as, for example, main memory 208, ROM 224, or in one or more peripheral devices 226 and 230, for example.

Databases 242 that are accessed for the backup and/or database applications can reside in the main memory 208 of each host (e.g., hosts 110, 112, 114). According to an embodiment, the main memory 208 also includes a central server repository 244, a central counter 246, and a journal file (also referred to herein as a "log") 248. In an example, the system 100 includes a plurality of hosts 110, 112, 114, each including a corresponding database 242, and each database 242 is associated with a corresponding central server repository 244, a corresponding central counter 246, and a corresponding journal file 248.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, although a distributed system is depicted, a single system alternatively can be employed. In such embodiment, some of the hardware (such as the additional server) may not be included. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including host computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
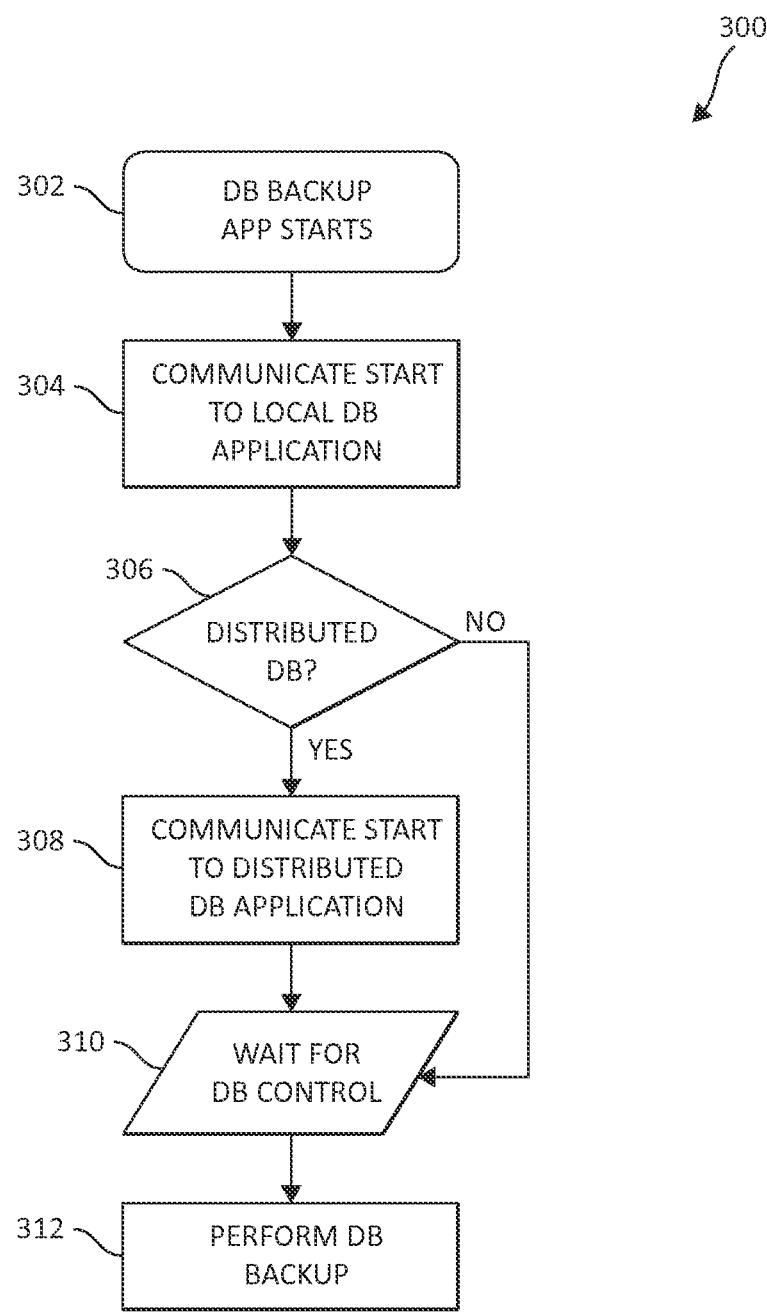
FIG. 3 is a flow diagram of a method of backing up a database from the perspective of the controller, according to an embodiment.

At times during the operation of the processing systems 100, 200, data may need to be backed up. To provide immediate control of the systems 100, 200 to the backup application, the systems 100, 200 are configured to operate according to method 300 in FIG. 3. FIG. 3 is a flow diagram of a method 300 of backing up a database from the perspective of the controller, according to an embodiment. In an embodiment, the method 300 begins when the backup application starts, step 302. For example, a controller (e.g., controller 209) provides a first signal to communicate a start of the backup application to a local database application, step 304. The local database application comprises computer code allowing other programs to access or update data contained on a database (e.g., database 242) on a particular host (e.g., hosts 110, 112, 114). The controller then determines whether the system is a distributed system, step 306. If so, then the controller also provides the first signal to each host in the system (e.g., hosts 110, 112, 114) indicating start of the backup application, step 308. Next, the controller waits for control of the database from the database application, step 310. Lastly, the backup application performs the database backup, step 312.

Returning to step 306, in another embodiment, if the controller determines that the system is not a distributed system, the backup application can forego step 306 and continue to step 310. In such case, the backup application waits for control of the database, step 310, and then performs the backup application after receiving control, step 312.

Figure 4:
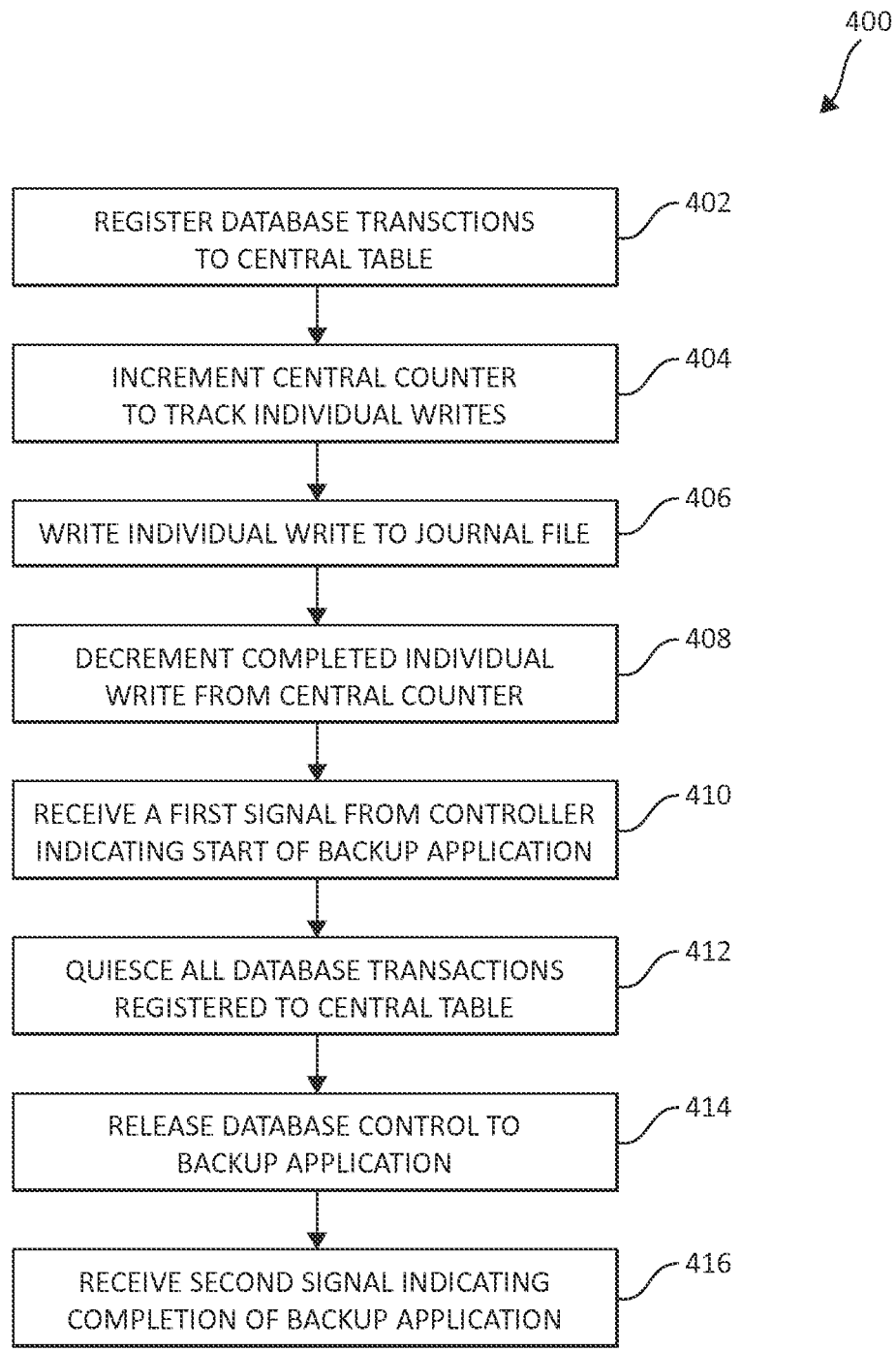
FIG. 4 is a flow diagram of a method of running the database application from the perspective of a host, according to an embodiment.

As alluded to above, prior to starting the backup application, the host runs the database application. In embodiments in which the system is a distributed system, more than one host runs its own database application so that a plurality of database applications can run concurrently to thereby access the same sets of databases. Generally, the database applications continue until the controller indicates the start of the backup application, such as in step 308. FIG. 4 is a flow diagram of a method 400 of running the database application from the perspective of the host(s), according to an embodiment.

As is known by those with skill in the art, database applications comprise a plurality of "database transactions." The database transactions are performed against one or more selected databases. Each database transaction is made up of a plurality of units of work comprising one or more individual reads and/or writes. Each read or write is performed against the selected database.

In any case, before performing each database transaction, the database transactions are registered to a central server repository, block 402. As noted above, each database application includes a corresponding central server repository (e.g., central server repository 244), in an embodiment. In this way, the controller can immediately provide commands to assess which particular databases are being utilized by which particular database applications. Additionally, by maintaining central repositories with each database application, assurances are made that this method can be used to perform a backup of a database that allows multiple concurrent transactions.

To track individual writes that are to be performed on the database, a central counter is incremented, block 404. The central counter (e.g., central counter 246) is associated with a corresponding database and thus, a plurality of central counters may be included in a system. The central counter allows the system to determine which of the individual writes of a database transaction which are ongoing writes. An "ongoing write" is an individual write that is being performed on the database. The ongoing write is logged on the central counter and remains an ongoing write until completion to thereby become a completed write. After completion or concurrently while being logged on the central counter, the completed write is written to a journal file, block 406. The journal file (e.g., journal file 248) maintains a log of all operations performed on the database. After the completed write, the central counter is decremented to remove the completed write, block 408.

When the backup application is ready to start, a first signal from the controller is received by the hosts, block 410. In response to the first signal, all database transactions registered to the central server repository quiesce, thereby waiting for all registered ongoing writes of the database transactions to complete and release control of the database, block 412. In this way, pending writes making up the registered database transactions (e.g., those that have not been registered to the central counter) may quiesce as well. The "pending writes" are individual writes that make up the database transaction and have not begun being written against the database. Database control is released to the backup application, block 414. At this point, the backup application starts and runs to completion.

After completion of the backup application, a second signal indicating the completion is received and control of the database is reacquired by the database application to resume processing of the remaining database transactions (e.g., pending writes of the database transactions and/or other database transactions) registered on the central server repository, block 416. The method 400 then reiterates at block 402.

Figure 5:
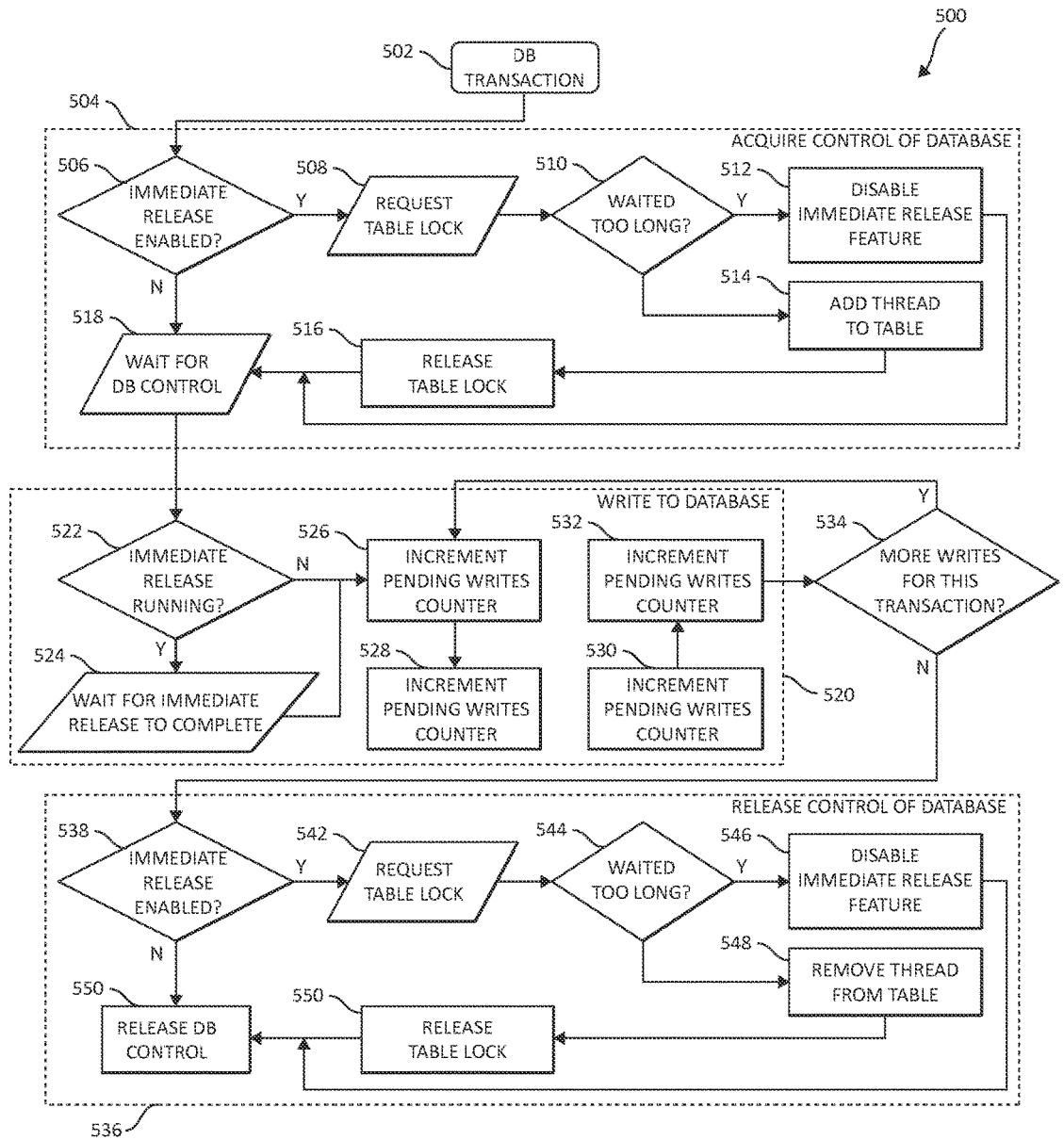
FIG. 5 is a flow diagram of a method of controlling the database from the perspective of the host or hosts of running the database application, according to an embodiment.

FIG. 5 is a flow diagram of a method 500 of controlling the database from the perspective of the host or hosts of running the database application, according to an embodiment. In this regard, whenever any database application is initiated, each database transaction to be executed as part of the database application is identified, block 502. Next, control of the database to be written on is acquired by the database application, block 504. In an embodiment, an immediate release transaction is initiated, block 506. As used herein, the term "immediate release" are actions taken on each host to release control of the database. After "immediate release" is initiated, a request to lock a central server repository on which database transactions are to be registered is made to the database, block 508. In this way, assurances are made that new database transactions will not start until the backup application completes. Then, a timer feature is initiated, block 510, which disables the method 500 if a predetermined amount of time is exceeded, block 512. If the predetermined amount of time is not exceeded, the database transactions are registered to the central server repository (block 514), the lock on the central server repository is released (block 516), and the database application waits for database control (block 518).

Next, the registered database transactions are written to the database 520. In an embodiment, a determination is made as to whether "immediate release" is running, block 522. If "immediate release" is running, then the system waits until "immediate release" completes, block 524. If "immediate release" is not running or is completed, then a central counter is incremented to indicate an individual write to be performed on the database, block 526. The central counter resides along with the central server repository at its corresponding host. The individual write is then entered into the journal file, block 528, which tracks all database transactions that are written to the database. Next, the individual write is performed on the database to thereby allow the database transaction to be written to the database, block 530. After the individual write is performed on the database, the central counter is decremented, block 532.

A determination is made as to whether more individual writes are to be performed to complete the database transaction, block 534. If more are to be performed, then blocks 526 through 534 are reiterated until each individual write needed to complete the database transaction is performed. In embodiments in which multiple database transactions are occurring concurrently, multiple individual writes may occur concurrently as well. In such case, blocks 528 through 534 are performed concurrently for each individual write of each database transaction.

Returning to block 534, if no other individual writes are pending for the database transaction, the database application releases control of the database, block 536. Specifically, a determination is made as to whether "immediate release" has been enabled, block 538. If not, database control is released, block 540. If "immediate release" is enabled, a request to lock a central server repository on which database transactions are to be registered is made to the database, block 542. This ensures new database transactions cannot start until the backup application completes. A timer feature is initiated, block 544, "immediate release" is disabled if a predetermined amount of time is exceeded, block 546. If the predetermined amount of time is not exceeded, the database transactions are removed from the central server repository (block 548), the lock is released (block 550), and the control of the database control is released (block 540). This mechanism prevents the release logic from impacting general database performance.

Blocks 504 through 550 (e.g., method 500) are repeated for each database transaction that will have control of the database application. The repeated steps occur concurrently for each database transaction to be performed. Hence, in a distributed system, each host of the system (e.g., hosts 110, 112, 114) has a corresponding central server repository and each database application run by each host registers every database transaction on that host to be performed on the corresponding central server repository to perform blocks 504 through 550. In this way, a plurality of database transactions from different hosts can be tracked concurrently.

Figure 6:
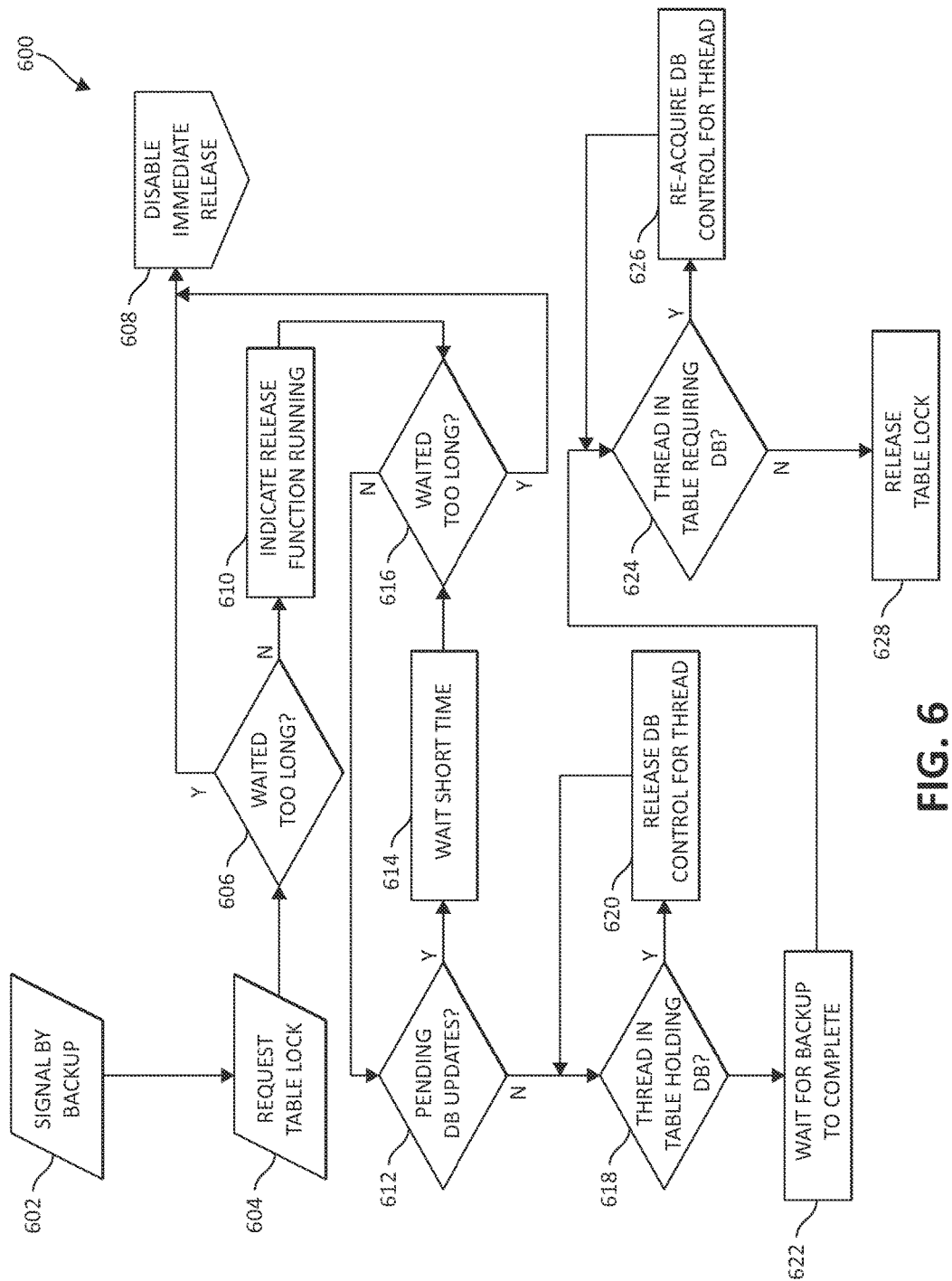
FIG. 6 is a flow diagram of a method of controlling the database from the perspective of the controller for running the backup application, according to an embodiment.

FIG. 6 is a flow diagram of a method 600 of controlling the database from the perspective of the controller for running the backup application, according to an embodiment. In an embodiment, a first signal is provided indicating a start of a backup application on the database, block 602. According to an embodiment, the first signal is provided by a controller (e.g., controller 209) to one or more of the hosts having pending database transactions registered on the central repositories. A request to lock the central server repository on which the registered database transactions are located is made to the database, block 604. This ensures new database transactions cannot start until the backup application completes. A timer feature then is initiated, block 606, which disables "immediate release" if a predetermined amount of time is exceeded, block 608. If the predetermined amount of time is not exceeded, "immediate release" continues to run, block 610.

Next, a determination is made as to whether any ongoing-writes are being written to the database, block 612. In this regard, the central counter is reviewed to thereby allow all ongoing writes incremented to the central counter to complete. In an embodiment in which the ongoing writes have not completed, a predetermined time period is allowed to elapse, block 614. A timer feature then is initiated, block 616, which disables "immediate release" if a predetermined amount of time is exceeded, block 608. If the predetermined amount of time is not exceeded, "immediate release" occurs and the method 600 returns to block 612.

If all ongoing writes are complete, a determination is made as to whether the database transaction for the incremented ongoing writes of block 612 has control of the database, block 618. If so, control is released to the backup application, block 620, and block 618 is reiterated. If not, the backup application is allowed to start and run to completion, block 622. After completion, a determination is made from the central repositories of each host whether the database is required to perform the next database transactions registered on the central repositories, block 624. If so, the database application reacquires control of the database to complete the registered database transactions, block 626. If not, then the central server repository lock is released, block 628.

The above-described methods and systems improve processes for backing up databases by allowing the backup application to immediately receive control of the database on a single-system or distributed system. Additionally, the methods, systems, and storage media greatly minimize impact of the backup application on database performance despite the complexity of the database application transactions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method of backing up a server database comprising:
registering each database transaction to a central server repository prior to starting the database transaction, each database transaction comprising a plurality of writes to be executed for a database application on a database;
receiving a first signal indicating a start of a backup application on the database;
upon receiving the first signal, quiescing all database transactions registered to the central server repository by initiating an immediate release of all ongoing transactions, and then requesting to lock the central server repository on which the database transactions are to be registered to thereby wait for all ongoing writes of the database transactions registered to the central server repository to complete and to release control of the database; and
incrementing a central counter indicating the ongoing writes of the plurality of writes which are being performed on the database, before the step of receiving.

2. The method of claim 1, further comprising:
writing each ongoing write to a journal file prior to performing the ongoing write on the database.

3. The method of claim 1, further comprising:
decrementing the central counter after the ongoing writes of the plurality of writes have been performed on the database.

4. The method of claim 1, further comprising:
receiving a second signal indicating completion of the backup application, after the step of quiescing; and
reacquiring control of the database to resume processing of remaining database transactions registered on the central server repository.

5. The method of claim 4, further comprising:
registering new database transactions to the central server repository prior to running the new database transactions, after the step of reacquiring.

6. The method of claim 1, wherein:
the database comprises a local database that is part of a distributed system; and
the method further comprises:
indicating whether the database comprises a part of a distributed system, after the step of receiving, and
performing the step of quiescing, after indicating the database comprises part of the distributed system.

* * * * *